(12) United States Patent
Nguyen et al.

(10) Patent No.: US 9,014,190 B2
(45) Date of Patent: Apr. 21, 2015

(54) ROUTING COMMUNICATIONS BASED ON NODE AVAILABILITY

(75) Inventors: Viet-Hung Nguyen, Saint-Mande (FR); Bastien Mainaud, Ris-Orangis (FR); Fabrice Monier, Bry sur Marne (FR); Jerome Bartier, Montrouge (FR)

(73) Assignee: Itron, Inc., Liberty Lake, WA (US)

( * ) Notice: Subject to any disclaimer, the term of this patent is extended or adjusted under 35 U.S.C. 154(b) by 145 days.

(21) Appl. No.: 13/364,044

(22) Filed: Feb. 1, 2012

(65) Prior Publication Data

US 2013/0121337 A1 May 16, 2013

Related U.S. Application Data

(63) Continuation of application No. PCT/US2012/023090, filed on Jan. 30, 2012.

(30) Foreign Application Priority Data

Nov. 11, 2011 (EP) ..................................... 11188904

(51) Int. Cl.
*H04L 12/28* (2006.01)
*H04W 40/12* (2009.01)
*H04L 12/26* (2006.01)
*H04L 12/721* (2013.01)
*H04L 12/741* (2013.01)

(52) U.S. Cl.
CPC .......... *H04W 40/12* (2013.01); *H04L 43/0805* (2013.01); *H04L 45/127* (2013.01); *H04L 45/70* (2013.01); *H04L 45/54* (2013.01); *Y04S 40/168* (2013.01)

(58) Field of Classification Search
None
See application file for complete search history.

(56) References Cited

U.S. PATENT DOCUMENTS

| | | | |
|---|---|---|---|
| 5,416,779 A * | 5/1995 | Barnes et al. | 370/280 |
| 6,810,428 B1 | 10/2004 | Larsen et al. | |
| 6,914,950 B1 | 7/2005 | Luneau | |
| 7,583,197 B2 | 9/2009 | Wesby Van Swaay | |
| 7,924,764 B2 | 4/2011 | Moorti et al. | |
| 8,094,010 B2 | 1/2012 | Wesby-van Swaay | |
| 2002/0180615 A1 * | 12/2002 | Kim et al. | 340/870.02 |

(Continued)

FOREIGN PATENT DOCUMENTS

| | | |
|---|---|---|
| GB | 2455794 A | 6/2009 |
| JP | 2002507343 | 3/2002 |

(Continued)

OTHER PUBLICATIONS

De Couto et al., "A High-Throughput Path Metric for Multi-Hop Wireless Routing," Proceedings of the Ninth Annual International Conference on Mobile Computing and Networking (MOBICOM 2003), San Diego, CA, USA, vol. Conf. 9, Sep. 14, 2003, pp. 134-146.

(Continued)

*Primary Examiner* — Hassan Phillips
*Assistant Examiner* — Gautam Sharma
(74) *Attorney, Agent, or Firm* — Lee & Hayes, PLLC

(57) ABSTRACT

A node receives information that is to be transmitted to a destination. Upon receipt of the information, the node may query a busy device list to determine an availability of one or more neighbor nodes. The node may then identify a neighbor node that, according to the busy device list, is available to receive transmissions and is capable of propagating the information to the destination. The node may then transmit the information to the identified neighbor node.

20 Claims, 7 Drawing Sheets

(56) References Cited

U.S. PATENT DOCUMENTS

| | | | |
|---|---|---|---|
| 2003/0058886 A1* | 3/2003 | Stanforth et al. | 370/468 |
| 2004/0203474 A1* | 10/2004 | Miller et al. | 455/69 |
| 2004/0246935 A1 | 12/2004 | Joshi et al. | |
| 2005/0002364 A1* | 1/2005 | Ozer et al. | 370/338 |
| 2005/0058151 A1* | 3/2005 | Yeh | 370/445 |
| 2005/0073992 A1* | 4/2005 | Lee et al. | 370/351 |
| 2005/0078631 A1* | 4/2005 | Cornwall | 370/330 |
| 2005/0089005 A1* | 4/2005 | Sakoda et al. | 370/348 |
| 2005/0099964 A1 | 5/2005 | Delaney et al. | |
| 2005/0185632 A1 | 8/2005 | Draves et al. | |
| 2005/0213602 A1* | 9/2005 | Redi | 370/445 |
| 2006/0034233 A1 | 2/2006 | Strutt et al. | |
| 2006/0045004 A1* | 3/2006 | Charzinski et al. | 370/216 |
| 2006/0077909 A1* | 4/2006 | Saleh et al. | 370/254 |
| 2006/0215577 A1 | 9/2006 | Guichard et al. | |
| 2006/0215583 A1 | 9/2006 | Castagnoli | |
| 2006/0215605 A1 | 9/2006 | Srikrishna et al. | |
| 2006/0256737 A1 | 11/2006 | Choi et al. | |
| 2007/0189182 A1 | 8/2007 | Berkman et al. | |
| 2007/0291660 A1 | 12/2007 | Robson et al. | |
| 2008/0089390 A1 | 4/2008 | Picard | |
| 2008/0151821 A1 | 6/2008 | Cho et al. | |
| 2008/0170544 A1 | 7/2008 | Tang et al. | |
| 2008/0171552 A1 | 7/2008 | Hyon et al. | |
| 2008/0298450 A1 | 12/2008 | Zhang et al. | |
| 2009/0003232 A1 | 1/2009 | Vaswani et al. | |
| 2009/0003356 A1 | 1/2009 | Vaswani et al. | |
| 2009/0086664 A1 | 4/2009 | Wu | |
| 2009/0267792 A1* | 10/2009 | Crichlow | 340/870.02 |
| 2010/0284334 A1 | 11/2010 | Shin et al. | |
| 2010/0290610 A1* | 11/2010 | Gore | 379/142.15 |
| 2011/0110351 A1 | 5/2011 | Seok | |
| 2011/0182326 A1 | 7/2011 | Picard | |
| 2011/0206087 A1 | 8/2011 | Picard | |
| 2013/0031253 A1 | 1/2013 | Hui et al. | |
| 2013/0051250 A1 | 2/2013 | Shaffer et al. | |
| 2013/0159479 A1 | 6/2013 | Vasseur | |
| 2013/0215942 A1 | 8/2013 | Addepalli et al. | |
| 2014/0029624 A1 | 1/2014 | Vasseur | |
| 2014/0036702 A1 | 2/2014 | Van Wyk et al. | |

FOREIGN PATENT DOCUMENTS

| | | |
|---|---|---|
| JP | 2009225444 | 10/2009 |
| WO | WO2004109474 A2 | 12/2004 |
| WO | WO2008044554 | 4/2008 |
| WO | WO2008105771 | 9/2008 |

OTHER PUBLICATIONS

The Extended European Search Report mailed Jan. 20, 2012 for European patent application No. 11188904.4, 7 pages.
The Extended European Search Report mailed Jan. 27, 2012 for European patent application No. 11188905.1, 9 pages.
Jungmin et al, "Multi-Channel MAC for Ad Hoc Networks: Handling Multi-Channel Hidden Terminals Using a Single Transceiver," MOBIHOC 2004, Proceedings of the 5th ACM International Symposium on Mobile Ad Hoc Networking and Computing, Tokyo, JP, May 24-26, 2004, pp. 222-233.
Wu et al., "A New Multi-Channel MAC Protocol with On-Demand Channel Assignment for Multi-Hop Mobile Ad Hoc Networks," Proceedings of the International Symposium on Parallel Architectures, Algorithms and Networks, Dec. 7, 2000, pp. 232-237.
The PCT Search Report mailed Oct. 25, 2012 for PCT application No. PCT/US12/23090, 9 pages.
The PCT Search Report mailed Nov. 1, 2012 for PCT application No. PCT/US12/23115, 8 pages.
Freaklabs—Open Source Wireless, IEEE 802.15.4 in the context of Zigbee—Part 2, Dec. 14, 2008, 8 pages.
Wireless Medium Access Control, IEEE 802.15.4, Speaker Chun-Yi Chen, Sep. 7, 2007, 40 pages.
Ahn et al., "Robust Multi-Channel Adaptaion for Smart Utility Networks," IEEE P802.15 Working Group for Wireless Personal Area Networks (WPAN's) May 8, 2009, pp. 1-49.
Chang et al., "Frequency Hopping Support in TG4g," IEEE P802.15/0258-10-01-004g, IEEE P802.15 Working Group for Wireless Personal Area Networks (WPAN's), Jun. 24, 2010, pp. 1-6.
Draves et al., "Routing in Multi-Radio, Multi-Hop Wireless Mesh Nteworks," MobiCom '04, Sep. 26-Oct. 1, 2004, Philadelphia, Pennsylvania, ACM 2004, pp. 114-128.
IEEE, "IEEE Standard for Local and Metropolitan Area Networks Part 15.4: Low Rate Wireless Personal Area Networks," Amendment to the MAC Sublayer, IEEE Computer Society, Oct. 2011, pp. 1-205.
Non-Final Office Action for U.S. Appl. No. 13/364,834, mailed on Mar. 25, 2013, Bastien Mainaud et al., "Routing Communications Based on Link Quality," 28 pages.
Rolfe, "Simplified Channel hopping for non-beacon PAN," IEEE P802.15 Working Group for Wireless Personal Area Networks (WPAN's) May 12, 2010, pp. 1-5.
Office action for U.S. Appl. No. 13/364,834, mailed on Sep. 6, 2013, Mainaud et al., "Routing Communications Based on Link Quality", 35 pages.
Benveniste, "CCC MMAC Protocol Framework and Optional Features", IEEE 802.11-05/0880r1, IEEE mentor, Nov. 11, 2005.
Emmelmann, "AP and Network Discovery Enhancements", IEEE 802.11-11/1521r1, IEEE mentor, Nov. 9, 2011.
The European Office Action mailed Nov. 28, 2013 for European patent application No. 11188904.4, a counterpart foreign application of U.S. Appl. No. 13/364,044, 4 pages.
Translated Japanese Office Action mailed Nov. 12, 2013 for Japanese patent application No. 2013-543423, a counterpart foreign application of U.S. Appl. No. 13/364,834, 9 pages.
Kojima, et al., "MAC Proposals for Low-Power Consumption", IEEE 802.15-09-0514-00-004e, IEEE mentor, Jul. 13, 2009.
Lee, et al, "EGTS Subgroup Report for IEEE 802.15.4e", IEEE 802.15-09-0666-01-004e, IEEE mentor, Sep. 22, 2009.
Lee, et al., "Required Changes for EGTS Extension", IEEE-15-09-0377-08-004e, IEEE mentor, Sep. 1, 2009.
Translated Japanese Office Action mailed Mar. 11, 2014 for Japanese patent application No. 2013-543423, a counterpart foreign application of U.S. Appl. No. 13/364,834, 8 pages.
The Extended European Search Report mailed Oct. 12, 2012 for European patent application No. 12179445.7, 5 pages.
Kopmeiners, et al. "A Standardized and Flexible IPv6 Architecture for Field Area Networks" Dec. 9, 2011, 22 pages.
Office Action for U.S. Appl. No. 13/648,095, mailed on Jun. 25, 2014, Hartman Van Wyk, "Multi-media multi-modulation method and multi-data rate mesh network", 37 pages.
Office action for U.S. Appl. No. 13/364,834, mailed on Jul. 25, 2014, Mainaud et al., "Routing Communications Based on Link Quality", 33 pages.
The PCT Search Report mailed Feb. 26, 2013 for PCT application No. PCT/US12/59389, 11 pages.

\* cited by examiner

ROUTING COMMUNICATIONS BASED ON NODE AVAILABILITY

RELATED APPLICATION

This application is a continuation of PCT International Application No. PCT/US12/23090, filed Jan. 30, 2012, which claims foreign priority to European Application No. 11188904.4, filed on Nov. 11, 2011, both of which are incorporated herein by reference.

BACKGROUND

Communication networks, such as mesh networks, are used to connect a variety of different devices. For example, mesh networks have been employed in the utility industry to connect utility meters, cellular relays, transformers, and/or other nodes. The nodes in the mesh network are typically able to receive data from neighboring nodes and to relay or propagate messages to other neighbor nodes.

In traditional wired networks, a routing metric may be used which rout routes messages based on a fewest number of hops between a source and a destination. In a wireless mesh network, however, a data rate between nodes may vary substantially from one link to another. This variation in data rate may be due, at least in part, to the fact that mesh networks often contain multiple different generations of nodes having different characteristics and capabilities. For example, different generations of nodes may employ or be capable of employing different modulation techniques and/or data rates. This may be particularly true for utility mesh networks in which nodes are placed into service gradually over time and are expected to remain in the field for relatively long life cycles (e.g., 20 years or more). Generally, newer generations of nodes are capable of additional modulations and higher data rates than older generations of nodes.

In addition, in the case of multi-channel networks in which multiple different nodes may be simultaneously transmitting on different channels, some destination nodes may miss transmissions intended for them because they are busy transmitting or receiving on a different channel. Traditionally, a node that sends a message to a destination device that is busy communicating with another device will not receive any response from the destination device. In that case, the node sending the message has no way of knowing if the transmission failed because of a poor link quality, because of a collision (i.e., multiple transmissions on the same channel at the same time), or because the destination device was simply busy communicating with another device on another channel.

Thus, existing routing metrics do not provide an effective way of routing transmissions within a heterogeneous multi-channel wireless mesh network that includes multiple different generations of nodes or nodes otherwise having differing capabilities.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
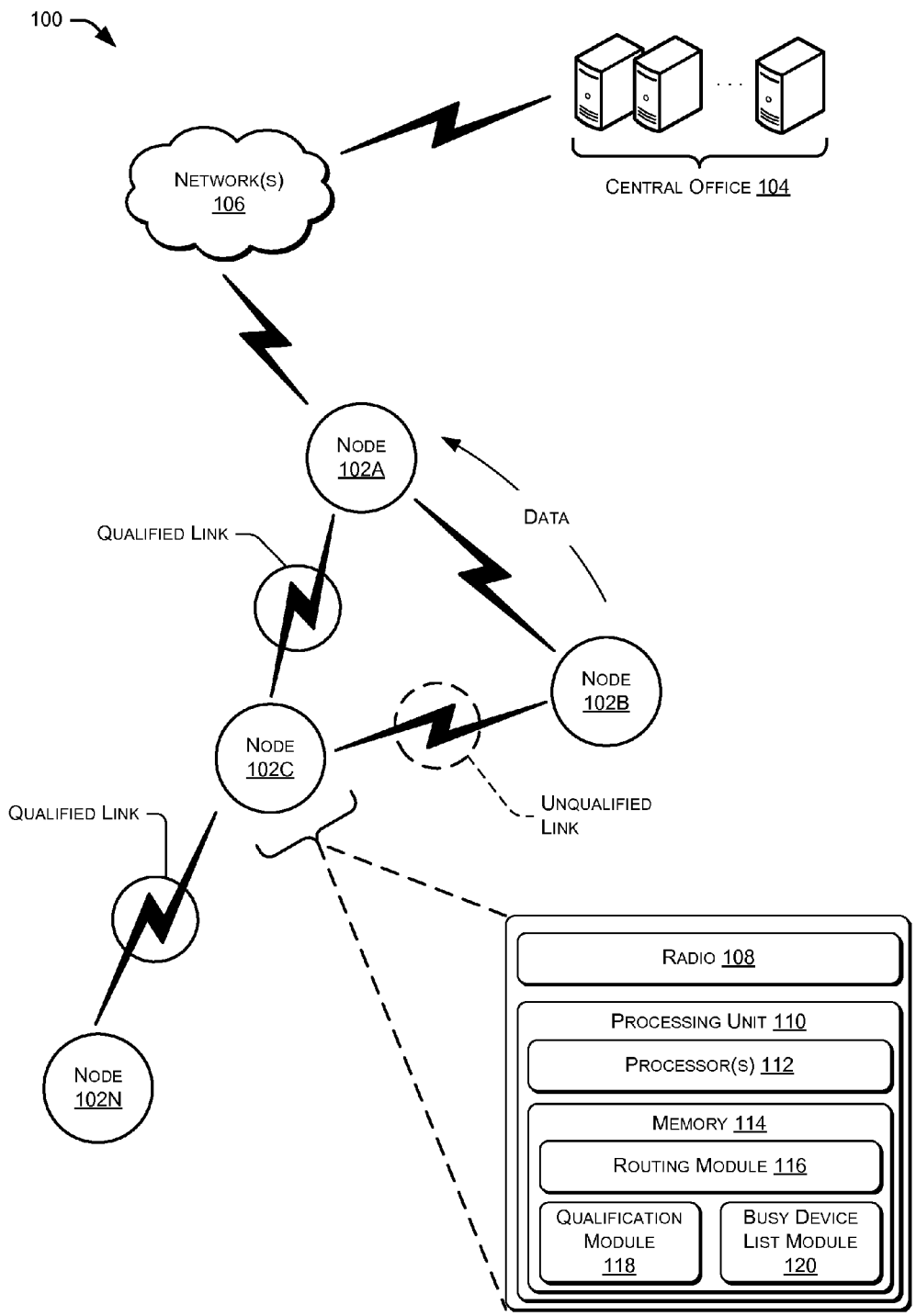
FIG. 1 is a schematic diagram of an example architecture of a multi-channel wireless mesh network in which transmissions can be effectively routed among nodes having multiple different capabilities.

As discussed above, existing routing metrics do not provide an effective way of routing transmissions within a multi-channel wireless mesh network. For example, existing routing metrics are not well suited to routing communications in a heterogeneous wireless mesh network in which nodes have differing capabilities such that a transmission data rate may vary from link to link. As used herein, a "link" refers to a direct transmission path between two nodes of a network (i.e., without passing through another node), such as by radio frequency (RF) signals. Data rate across a link between two nodes is at least partially dependent on the transmission capabilities (e.g., compatible modulation techniques and data rates) of the two nodes. As such, a maximum data rate across a link is limited by the capabilities of the slowest node of the link.

This application describes techniques for intelligently routing communications between and/or among nodes of a heterogeneous wireless mesh network. For example, this application describes determining quality of links between nodes of the network, and routing communications based at least in part on the determined quality of the links.

Conventional routing metrics also typically do not account for the so called "missing destination problem," in which destination nodes may miss transmissions intended for them because they are busy transmitting or receiving on a different channel. When employing a conventional routing metric, a node that does not receive a response from an intended destination node may think that a collision has occurred and increase the size of its contention window (i.e., the average amount of time the node will wait before attempting to retransmit the message). This increased wait time may cause unnecessary delay and inefficiency in propagating the transmission to its intended destination.

This application also describes maintaining a busy device list for each node, which includes availability information for one or more neighbor nodes. Communications may be routed based at least in part on the availability information of neighbor nodes maintained in the busy device list.

Thus, in various embodiments described in this application, transmissions may be routed in a communication network, such as a multi-channel mesh network, based on link quality (e.g., based on a list of qualified links), availability of neighbor nodes (e.g., based on a busy device list), or both.

The routing techniques are described in the context of a utility mesh network including a plurality of nodes. Nodes of the utility mesh network may include, for example, smart utility meters (e.g., electric, gas, and/or water meters), sensors (e.g., temperature sensors, weather stations, frequency sensors, etc.), control devices, transformers, routers, servers, relays (e.g., cellular relays), switches, valves, and other network devices. While the routing techniques are described in the context of a utility mesh network, the routing techniques may additionally or alternatively be applicable to other networks and/or other applications. As such, in other implementations, nodes may include any device coupled to a communication network and capable of sending and/or receiving data.

Multiple and varied implementations and embodiments are described below, beginning with overviews of "Routing Based on Link Quality" and "Routing Based on Node Availability." These overviews are followed by descriptions of an "Example Architecture" and an "Example Node" usable to implement the routing techniques described herein. Next, the application describes additional details of an "Example Process of Routing Based on Link Quality" and an "Example Process of Routing Based on Node Availability." Following the detailed discussion of the example routing processes, the application includes a description of several "Example Protocol Data Units (PDUs)" that may be used to implement routing methods such as those described herein. Finally, the application concludes with a brief "Conclusion." This Overview and the following sections, including the section headings, are merely illustrative implementations and embodiments and should not be construed to limit the scope of the claims.

Overview of Routing Based on Link Quality

In one example implementation, this application describes determining quality of links between nodes of a communication network, such as a multi-channel utility network, and routing communications based at least in part on the determined quality of the links. In this example, a node determines a link quality between the node and multiple neighbor nodes. For each of the multiple neighbor nodes, the node compares the determined link quality between the node and the respective neighbor node to a predetermined threshold quality. If the link quality meets the predetermined threshold quality, the node may qualify the link and add the link to a list of qualified links that meet the threshold link quality. The node may then route communications to neighbor nodes with which the node has a qualified link.

The node may determine a quality of links between the node and one or more of its neighbor nodes. In one example, if a node has a relatively small number of neighbor nodes (e.g., less than 10), the node may determine quality of the links between it and all of its neighbor nodes. Alternatively, if the node has many neighbor nodes, the node may determine a link quality between itself and a subset of its neighbor nodes. In one example, the node may continue to determine quality of links with its neighbor nodes until it determines a predetermined number of links (e.g., 5, 10, 20, etc.) that meet the threshold link quality, thereby ensuring a sufficient number of good communication paths for the node.

The node may determine quality of a link with a neighbor node by exchanging a series of communications with the neighbor node over the link. For example, in one implementation the node may send a request-to-send (RTS) message to the neighbor node. The request to send message may designate a sequence of communication channels to test. For example, the sequence of communication channels to be tested may be designated by a beginning channel number to test, a step interval between channels to test, and a number of channels to test. In response, the node may receive a clear-to-send (CTS) message from the neighbor node indicating that the neighbor node is available to receive transmissions. The node may then proceed to test the sequence of communication channels between the node and the respective neighbor node by sending test data packets to the neighbor node according to the sequence of communication channels to test. Upon receiving the test data packets, the neighbor node may send back test data packets according to the same sequence of communication channels. Each of the test data packets may include an indication of a cost in time of transmission through the link.

Upon receiving back the test data packets from the neighbor node, the node may calculate link quality between the node and the neighbor node based on the testing of the sequence of communication channels. The node may also send a confirmation packet including a number of test data packets the node received from the neighbor node. The neighbor node may use the confirmation packet to evaluate the link quality between the node and the respective neighbor node. If the link quality meets the predetermined threshold quality, the node may qualify the link and add the link to the list of qualified links that meet the threshold link quality. A link may be qualified for all or less than all of the communication channels. For example, a link may be qualified for less than all channels in order to promote channel diversity to reduce the likelihood of interference and collisions from other neighboring nodes. Also, nodes may be qualified for less than all channels if, for example, one or more channels were found during the exchange of test data to experience interference or otherwise have poor quality transmission. In some examples, list of qualified links may include a ranking of neighbor nodes according to the relative quality of links between the node and the respective neighbor node. In that case, the node may route communications to its neighbor nodes based at least in part on the relative quality of links (e.g., routing communications to an available neighbor node connected to the node by a link having the highest quality).

Various different metrics may be used to calculate link quality between nodes. In one specific example, link quality may be calculated based on an expected transmission time (ETT) of communications across the link. ETT may be calculated according to the following equation:

$$ETT = \frac{S}{B} \times ETX \qquad (1)$$

where $$ETX = \frac{1}{1-P}, P = 1 - (1 - Pf) \times (1 - Pr),$$

P is a loss rate on a link,

Pf is a probability that a data packet successfully arrives at the neighbor node, Pr is a probability that a confirmation from the neighbor node is successfully received, S is packet size of the data packet (e.g., in Bits, or other units), and B is a bandwidth of the link between the two nodes (e.g., in Bits/second or other units).

For example, considering 2 nodes x and y, the Pf for node x will be the number of test data packets received by node y from node x divided by the number of test data packets sent by node x. The Pr for node x will be the number of test data packets received by node x from node y divided by the number of test data packets sent by node y. Pf and Pr for node y will be computed in the same way. Equation (1) is just one example routing metric that may be used to measure link quality, and, in other examples, various other metrics may be used to measure link quality.

If after receiving the RTS, the neighbor node is not or will not be available to receive communications (e.g., the neighbor already has a previously scheduled communication), the neighbor node may send back a not-clear-to-send (NCTS) message. If the neighbor node is busy communicating on another channel, the neighbor node may not receive the RTS and, therefore, will not respond. If the node receives a NCTS or does not receive any response, the node may wait a period of time and try again and/or may try a different neighbor node.

Overview of Routing Based on Node Availability

In another example implementation, this application describes maintaining a busy device list for each node, which includes availability information for one or more neighbor nodes, and routing transmissions based on availability of the neighbor nodes. In this example, a node receives some information (e.g., resource consumption data, a report, an alert, a status message, a software/firmware update, etc.) that is to be transmitted to a destination. The information may be received from a neighbor node or from a system or component (e.g., a local sensor or metrology module) of the node itself. Upon receipt of the information, the node may query a busy device list to determine an availability of one or more neighbor nodes. The node may then identify a neighbor node that, according to the busy device list, is available to receive transmissions and is capable of propagating the information to the destination. The node may then transmit the information to the identified neighbor node.

The busy device list is generally maintained in local memory of the node itself (e.g., at a medium access control (MAC) sub layer of the node). However, in some implementations, the busy device list may additionally or alternatively be maintained at another location on the network (e.g., a parent node, cellular router, relay, network storage device, or the like).

The busy device list may be generated, maintained, and updated based on reservation information contained in messages overheard by the node on a control channel of the multi-channel communication network. The reservation information may identify nodes that are (or will be) busy and a duration that they will be busy. This reservation information may be included in a variety of messages including, for example, request-to-send (RTS) messages addressed to other nodes of the multi-channel communication network, and/or clear-to-send (CTS) messages addressed to other nodes of the multi-channel communication network.

Example Architecture

FIG. 1 is a schematic diagram of an example architecture 100 of a multi-channel, wireless mesh network in which transmissions can be routed according to link quality and/or availability of nodes. The architecture 100 includes a plurality of nodes 102A, 102B, 102C, . . . 102N (collectively referred to as nodes 102) communicatively coupled to each other via direct communication paths or "links." In this example, N represents a number of nodes in an autonomous routing area (ARA), such as a wide area network (WAN), metropolitan area network (MAN), local area network (LAN), neighborhood area network (NAN), personal area network (PAN), or the like.

As discussed above, the term "link" refers to a direct communication path between two nodes (without passing through or being propagated by another node). Each link may represent a plurality of channels over which a node is able to transmit or receive data. Each of the plurality of channels may be defined by a frequency range which is the same or different for each of the plurality of channels. In some instances, the plurality of channels comprises RF channels. The plurality of channels may comprise a control channel and multiple data channels. In some instances, the control channel is utilized for communicating one or more messages between nodes to specify one of the data channels to be utilized to transfer data. Generally, transmissions on the control channel are shorter relative to transmissions on the data channels.

Each of the nodes 102 may be implemented as any of a variety of conventional computing devices such as, for example, smart utility meters (e.g., electric, gas, and/or water meters), sensors (e.g., temperature sensors, weather stations, frequency sensors, etc.), control devices, transformers, routers, servers, relays (e.g., cellular relays), switches, valves, combinations of the foregoing, or any device couplable to a communication network and capable of sending and/or receiving data.

In this example, the nodes 102 are also configured to communicate with a central office 104 via an edge device (e.g., cellular relay, cellular router, edge router, DODAG root, etc.) which serves as a connection point of the ARA to a backhaul network(s) 106, such as the Internet. In the example illustrated example, the node 102A serves as a cellular relay to relay communications from the other nodes 102B-102N of the ARA to and from the central office 104 via the network(s) 106.

The node 102C is representative of each of the nodes 102 and includes a radio 108 and a processing unit 110. The radio 108 comprises a radio frequency (RF) transceiver configured to transmit and/or receive RF signals via one or more of a plurality of channels/frequencies. In some implementations, each of the nodes 102 includes a single radio 108 configured to send and receive data on multiple different channels, such as the control channel and multiple data channels of each communication link. The radio 108 may also be configured to implement a plurality of different modulation techniques, data rates, protocols, signal strengths, and/or power levels. The architecture 100 may represent a heterogeneous network of nodes, in that the nodes 102 may include different types of nodes (e.g., smart meters, cellular relays, sensors, etc.), different generations or models of nodes, and/or nodes that otherwise are capable of transmitting on different channels and using different modulation techniques, data rates, protocols, signal strengths, and/or power levels.

The processing unit 110 may include one or more processor(s) 112 communicatively coupled to memory 114. The memory 114 may be configured to store one or more software and/or firmware modules, which are executable on the processor(s) 112 to implement various functions. While the modules are described herein as being software and/or firmware executable on a processor, in other embodiments, any or all of the modules may be implemented in whole or in part by hardware (e.g., as an ASIC, a specialized processing unit, etc.) to execute the described functions.

In the embodiment of FIG. 1, the memory 114 includes a routing module 116, a qualification module 118, and a busy device list module 120. The routing module 116 is configured to route transmissions between and among nodes 102 of the ARA based on a quality of links between the nodes 102 determined by the qualification module 118, availability of the nodes 102 determined by the busy device list module 120, and/or one or more other factors. Additional details of how the routing module 116 may route communications based on these and other factors is provided below in the discussion of FIGS. 2-5.

The qualification module 118 is configured to determine the quality of links between the nodes 102. In the illustrated example, the qualification module 118 of node 102C has determined that the links between node 102C and its neighbor nodes 102A and 102N meet a threshold level of quality and are therefore designated as "qualified links." Meanwhile, the qualification module 118 either has not yet determined a quality of the link between node 102C its neighbor node 102B, or the qualification module 118 has determined that the link between node 102C and its neighbor node 102B does not meet the threshold level of quality (e.g., the link experiences interference, is has a weak or attenuated signal, or is otherwise unsuitable for transmission). Therefore, the link between node 102C and its neighbor node 102B is designated as an unqualified link in FIG. 1.

The busy device list module 120 is configured to determine availability of nodes 102 and to maintain listing of the nodes which are (or will be) busy and a duration that they will be busy. In the illustrated example, the busy device list module 120 would indicate that node 102B is busy transmitting data to node 102A and is, therefore, unavailable to receive transmissions from node 102C.

The memory 114 may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

The network(s) 106, meanwhile, represents a backhaul network, which may itself comprise a wireless or a wired network, or a combination thereof. The network(s) 106 may be a collection of individual networks interconnected with each other and functioning as a single large network (e.g., the Internet or an intranet). Further, the individual networks may be wireless or wired networks, or a combination thereof.

The central office 104 may be implemented by one or more computing devices, such as servers, personal computers, laptop computers, etc. The one or more computing devices may be equipped with one or more processor(s) communicatively coupled to memory. In some examples, the central office 104 includes a centralized meter data management system which performs processing, analysis, storage, and/or management of data received from one or more of the nodes 102. For instance, the central office 104 may process, analyze, store, and/or manage data obtained from a smart utility meter, sensor, control device, router, regulator, server, relay, switch, valve, and/or other nodes. Although the example of FIG. 1 illustrates the central office 104 in a single location, in some examples the central office may distributed amongst multiple locations and/or may be eliminated entirely (e.g., in the case of a highly decentralized distributed computing platform).

Example Node

Figure 2:
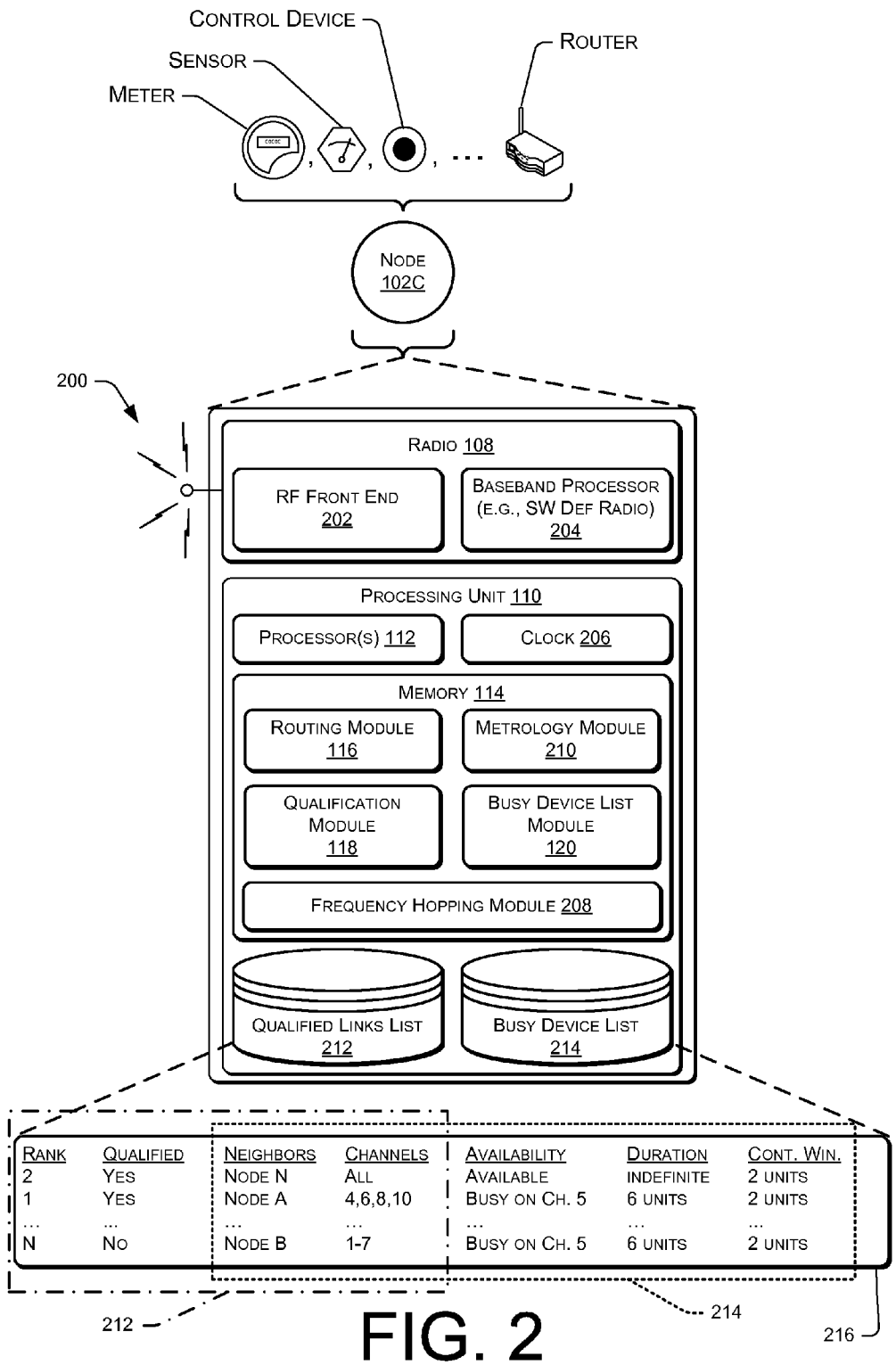
FIG. 2 is a schematic diagram showing additional details of an example node of the architecture of FIG. 1.

FIG. 2 is a schematic diagram showing additional details of example node 102C of FIG. 1. In this example, the radio 108 includes an antenna 200 coupled to an RF front end 202 and a baseband processor 204. The RF front end 202 may provide transmitting and/or receiving functions. The RF front end 202 may include high-frequency analog and/or hardware components that provide functionality, such as tuning and/or attenuating signals provided by the antenna and obtained from one or more of the nodes 102. The RF front end 202 may provide a signal to the baseband processor 204.

In one example, all or part of the baseband processor 204 may be configured as a software (SW) defined radio. In one example, the baseband processor 204 provides frequency and/or channel selection functionality to the radio 108. For example, the SW defined radio may include mixers, filters, amplifiers, modulators and/or demodulators, detectors, etc., implemented in software executed by a processor or application specific integrated circuit (ASIC) or other embedded computing device(s). The SW defined radio may utilize processor(s) 112 and software defined or stored in memory 114. Alternatively, the radio 108 may be implemented at least in part using analog components.

The processing unit 110 may also include a clock 206 configured to maintain a time. The clock 206 may also be configured to provide one or more count-up or count-down timers. Such timers may be used in frequency hopping among multiple communication channels.

A frequency hopping module 208 may be configured to communicate with the baseband processor 204 and the clock 206. In one example, the frequency hopping module 208 is configured to obtain time information and/or set frequency-hopping timers in the clock 206. Such time information and/or timers will indicate to the frequency hopping module 208 when to "hop" or tune a different channel or frequency. Additionally, the frequency hopping module 208 may be configured to direct the SW defined radio or other component of the radio 108 to perform the actual frequency changes. Accordingly, the frequency hopping module 208 is able to repeatedly shift between agreed upon frequencies, at agreed upon times and communicate with another node(s) for agreed upon periods of time and in agreed upon protocols.

In some implementations (e.g., when the node is a utility meter), the memory 114 may also include a metrology module 210 configured to collect consumption data of one or more resources (e.g., electricity, water, natural gas, etc.), which may then be transmitted to one or more other nodes 102 for eventual propagation to the central office 104 or other destination.

As discussed above, the memory 114 also includes the qualification module 118 and the busy device list module 120. The qualification module 118 determines the quality of links between nodes and stores information regarding the quality of the links in a qualified links list 212 or other repository of link quality information. Likewise, the busy device list module 120 determines availability of nodes 102 and to maintains listing of the nodes which are (or will be) busy and a duration that they will be busy in a busy device list 214 or other repository of node availability data. While the qualified links list 212 and the busy device list 214 are shown as being lists of data stored in local memory of the node 102C, in other embodiments the link quality and node availability information may be stored in a single list or in a non-list form.

Furthermore, in some embodiments, the link quality and node availability information may additionally or alternatively be maintained at one or more other locations on the network (e.g., a parent node, cellular router, relay, network storage device, or the like).

As discussed above, the qualified links list 212 and the busy device list 214 may be maintained as separate lists or as one composite list. In the illustrated example, the qualified links list 212 and the busy device list 214 are stored as a composite list 216 in memory 114. As illustrated in this figure, the qualified links list 212 and the busy device list 214 in this example include some overlapping information.

The portions of the composite list 216 that generally correspond to the qualified link list 212 are bounded by the by the dash-dot region, and in this example include a list of neighbor nodes (under the heading "Neighbors") with which the node has a communication link, an indication of whether the link with each neighbor node is qualified (under the heading "Qualified"), a list of channels that are qualified for each link (under the heading "Channels"), and a ranking of the links by relative quality of the links (under the heading "Rank"). However, in other embodiments, the qualified link list 212 may include additional or alternative information (e.g., a relative quality score of the links, a relative quality of individual channels of each link, a maximum data rate for each link or each channel of each link, etc.).

The portions of the composite list 216 that generally correspond to the busy device list 214 are bounded by the dotted region, and in this example include a list of neighbor nodes (under the heading "Neighbors") with which the node has a communication link, a list of channels that are qualified for each link (under the heading "Channels"), an availability status of each node (under the heading "Availability"), and a duration corresponding to the availability status (under the heading "Duration"). As used herein a node is "available" or "has availability" to receive a transmission if it is affirmatively noted in the busy device list as being available (e.g., has scheduled/reserved time to receive the communication) or if it is implicitly available (e.g., nodes that are not noted as being unavailable and are therefore assumed to be available). In other embodiments, the busy device list 214 may include additional or alternative information (e.g., type of operation being performed by busy nodes, size of data being transmitted/received by busy nodes, etc.).

The routing module 116 may route transmissions based on link quality as indicated in the qualified link list 212, availability of neighbor nodes as indicated in the busy device list 214, or based on both using a composite list 216. For example, according to one illustrative routing metric, nodes might attempt to route transmissions to an available node having the best link quality rank. Thus, in the illustrated example, the node 102C might route transmissions to node N on one of channels 1-7, except channel 5 (since as discussed below channel 5 is currently in use by nodes A and B), since node N is both available for an indefinite duration and is the highest quality qualified link (i.e., lowest rank) available (assuming that node N is otherwise able to propagate a transmission toward its ultimate destination). In this example, node A is not immediately available to receive transmissions since it is busy transmitting data to node B on channel 5, so node C will not route the transmission to node A despite the fact that node A has a higher quality link (i.e., lower rank). Also, node C will not route transmissions to node N on channel 5 in order to avoid disturbing transmissions between nodes A and B on channel 5.

According to an alternative routing metric, the routing module 116 may weight link quality more heavily than availability. In that case, again referring to the illustrated embodiment, rather than transmitting data to node N which is available immediately, node C might choose to wait to transmit data to node A when node A becomes available because node A has a higher quality (i.e., lower rank) link quality. In yet another alternative, node C may choose to wait to route the communication to node A, but only if node A will become available in a relatively short period of time. In other words, the decision of where to route the communication may strike a balance between link quality and duration until availability.

Example Method of Routing Based on Link Quality

Figure 3:
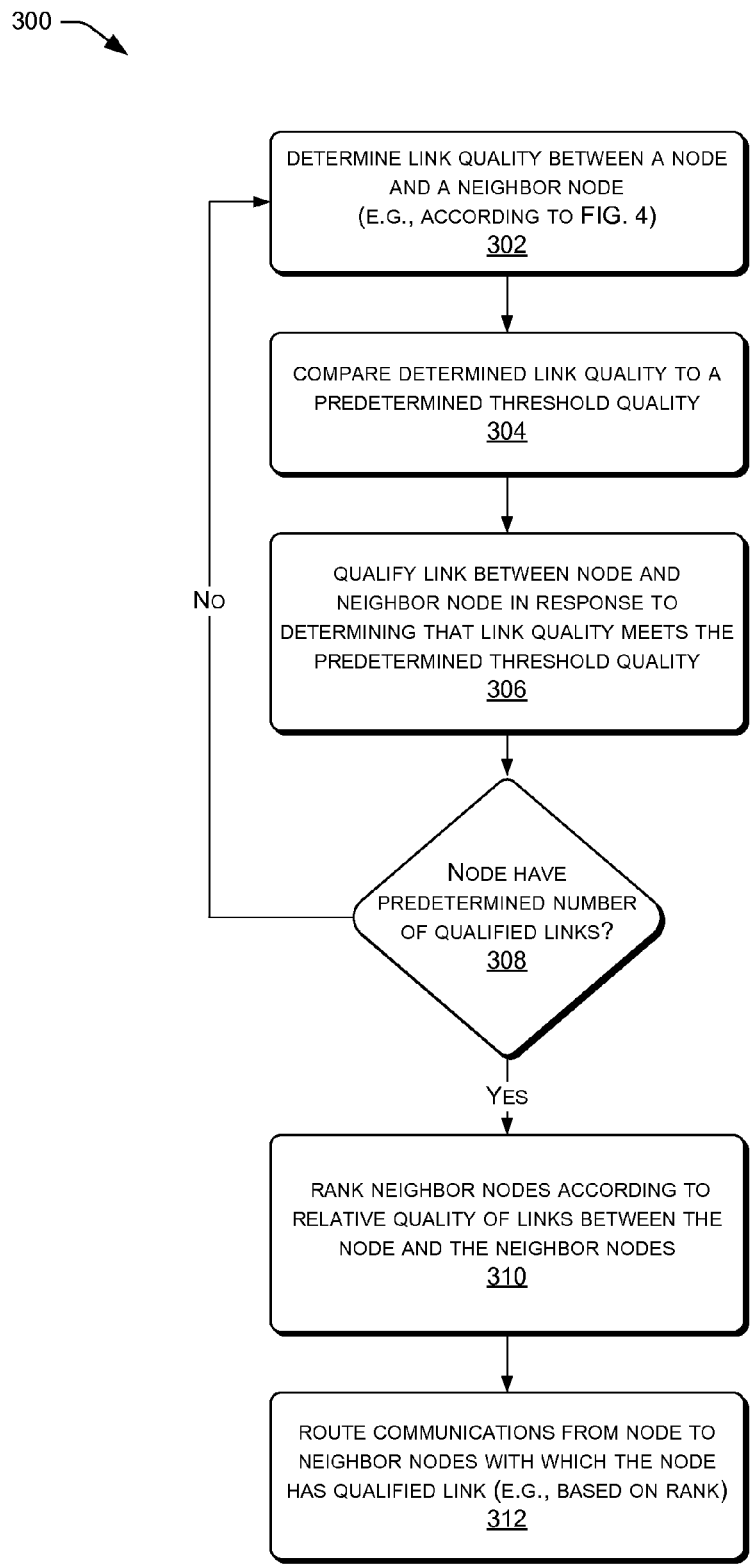
FIG. 3 is a flowchart illustrating an example method of routing transmissions in a multi-channel wireless mesh network according to a quality of links between nodes of the network.

FIG. 3 illustrates an example method 300 of determining quality of links between nodes of a mesh network and routing communications based at least in part on the link quality. The method 300 is described with reference to the example architecture 100 of FIG. 1 for convenience. However, the method 300 is not limited to use with the example architecture 100 of FIG. 1 and may be implemented using other architectures and devices.

The method 300 begins at block 302, with a node, such as node 102C, determining a quality of a link with a neighbor node, such as node 102N. The link quality determination may be performed by a qualification module, such as qualification module 118 of node 102C. Additional details of the link qualification process will be described below with reference to FIG. 4.

Once the node 102C has determined a quality of the link with the neighbor node 102N, at block 304, the qualification module 118 of node 102C compares the determined link quality with a threshold link quality. If the determined link quality meets (i.e., is greater than or equal to) the threshold link quality, the node 102C will, at 306, qualify the link between the node 102C and the neighbor node 102N and add the link to the qualified link list 212.

At block 308, the node 102C determines whether a predetermined number of qualified links exist. The predetermined number of qualified links may equal the number of links the node has with its immediate neighbors, or the predetermined number of qualified links may be less than all of the number of links the node has with its immediate neighbors. For example, the predetermined number of qualified links may comprise a number (e.g., 3, 5, 10, etc.) sufficient to ensure a good communication path for the node even during times of heavy network traffic. If, at block 308, the node 102C determines that "No" the predetermined number of qualified links does not exist, the node 102C may repeat the operations of blocks 302-306 until the predetermined number of qualified links is achieved. If, on the other hand, the node 102C determines, at block 308, that "Yes" the predetermined number of qualified links exist, the node 102C may proceed in some embodiments to, at block 310, rank the neighbor nodes according to the relative quality of the links between the node 102C and the neighbor nodes 102A, 102B, and 102N. However, in other embodiments, the ranking operation 310 may be omitted.

At block 312, the routing module 116 of node 102C may begin routing communications to its neighbor nodes with which it has a qualified link. Thus, in the illustrated example, node 102C may begin routing communications to nodes 102A and 102N, but not node 102B, since node 102C has qualified links with nodes 102A and 102N, but not with node 102B. In addition to or instead of routing communications based simply on the existence of a qualified link, if the node 102C ranked the neighbor nodes based on link quality at block 310, the node 102C may route communications based on the link quality rankings (e.g., giving preference to send communications via higher quality links).

Figure 4:
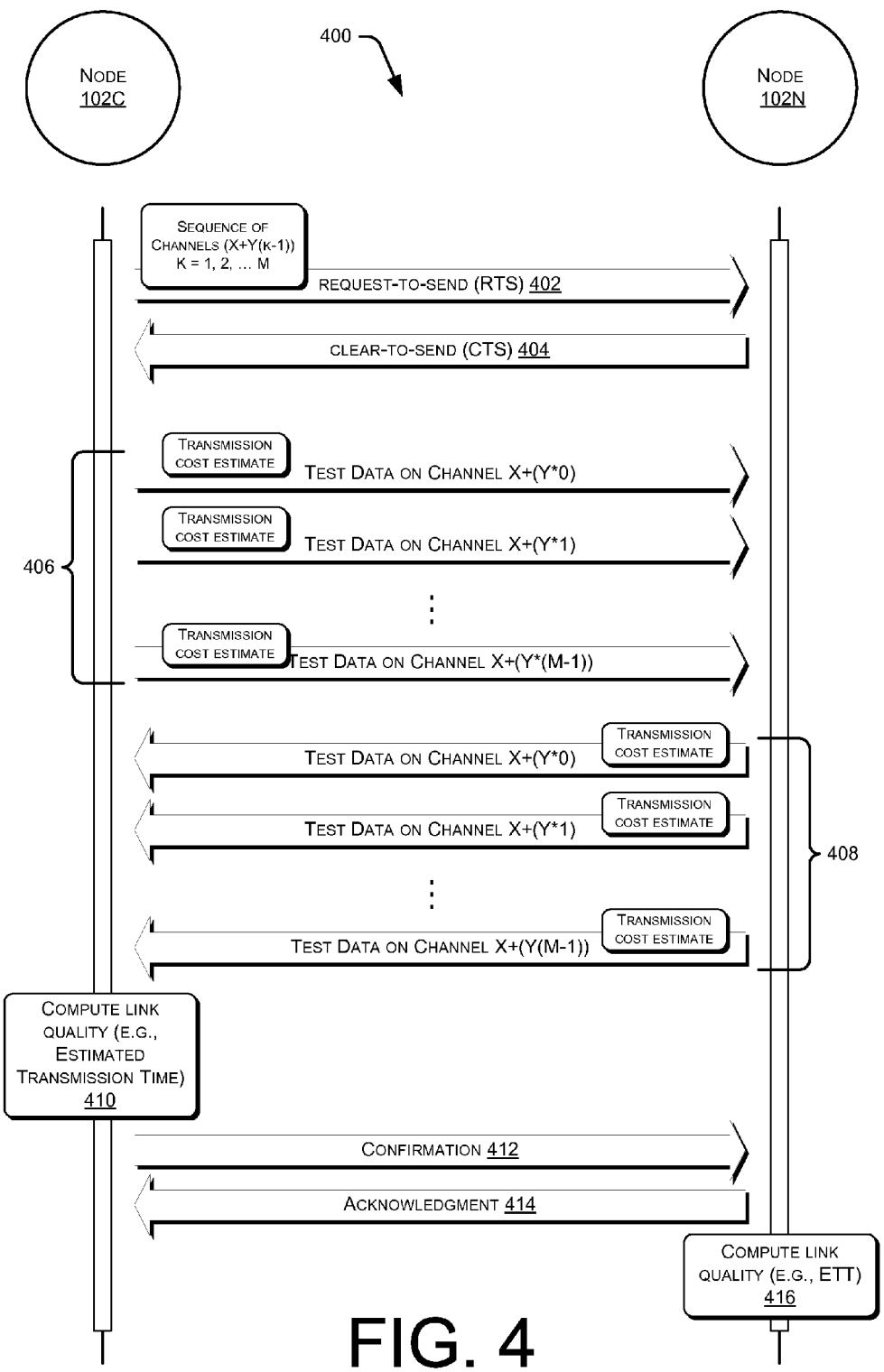
FIG. 4 is a signal flow diagram of an example method of determining a quality of links of a multi-channel wireless mesh network.

FIG. 4 is a signal flow diagram illustrating additional details of an example method 400 of qualifying links based on link quality. The method 400 is described with reference to nodes 102C and 102N of the example architecture 100 of FIG. 1 for convenience. However, the method 400 is not limited to use with the example architecture 100 of FIG. 1 and may be implemented using other architectures and devices.

In FIG. 4, a node, such as node 102C, may determine quality of a link with a neighbor node, such as node 102N, by exchanging a series of communications with the neighbor node over the link. For example, at operation 402, node 102C may send a request-to-send (RTS) message to the neighbor node 102N. The request to send message may designate a sequence of communication channels to test. For example, the sequence of communication channels to be tested may be designated by a beginning channel number to test X, a step interval Y between channels to test, and a number M of channels to test. The sequence of channels may be expressed mathematically according to the following equation:

$$(X+Y(k-1)), k=1, 2, \ldots M \qquad (2)$$

In this equation, k is a number of the channel in the sequence (e.g., first channel tested).

Subsequently, the node 102C may, at operation 404, receive a clear-to-send (CTS) message from the neighbor node 102N indicating that the neighbor node is available to receive transmissions. The node 102C may then proceed, at operation 406, to test the sequence of communication channels between the node 102C and the respective neighbor node 102N by sending test data packets to the neighbor node according to the sequence of communication channels to test. Upon receiving the test data packets, the neighbor node 102N may, at operation 408, send back test data packets according to the same sequence of communication channels. Each of the test data packets returned at operation 408 may include an indication of a cost in time of transmission through the link, as well as the number of test data packets the node 102N received from the node 102C.

Upon receiving back the test data packets from the neighbor node, at operation 410, the node 102C may calculate link quality between the node 102C and the neighbor node 102N based on the testing of the sequence of communication channels. For example, the node 102C may calculate the link quality according to Equation (1) above. Alternatively, various other metrics may be used to calculate link quality. If the link quality meets the predetermined threshold quality, the node 102C may qualify the link and add the link to its list of qualified links that meet the threshold link quality as discussed above with reference to FIG. 3.

At operation 412, node 102C may also send a confirmation packet including a number of test data packets the node 102C received from the neighbor node 102N. At operation 414, neighbor node 102N may send an acknowledgement packet to node 102C, indicating the successful reception of the confirmation packet sent by 102C. At operation 416, neighbor node 102N may use the confirmation packet to evaluate the link quality between the node 102C and the neighbor node 102N (e.g. using the link quality metric of equation 1 above). If the link quality meets the predetermined threshold quality, the neighbor node 102N may qualify the link and add the link to its list of qualified links that meet the threshold link quality as discussed above with reference to FIG. 3. Method 400 may be performed as many times as needed to qualify a predetermined number of links for each node.

Example Method of Routing Based on Node Availability

Figure 5:
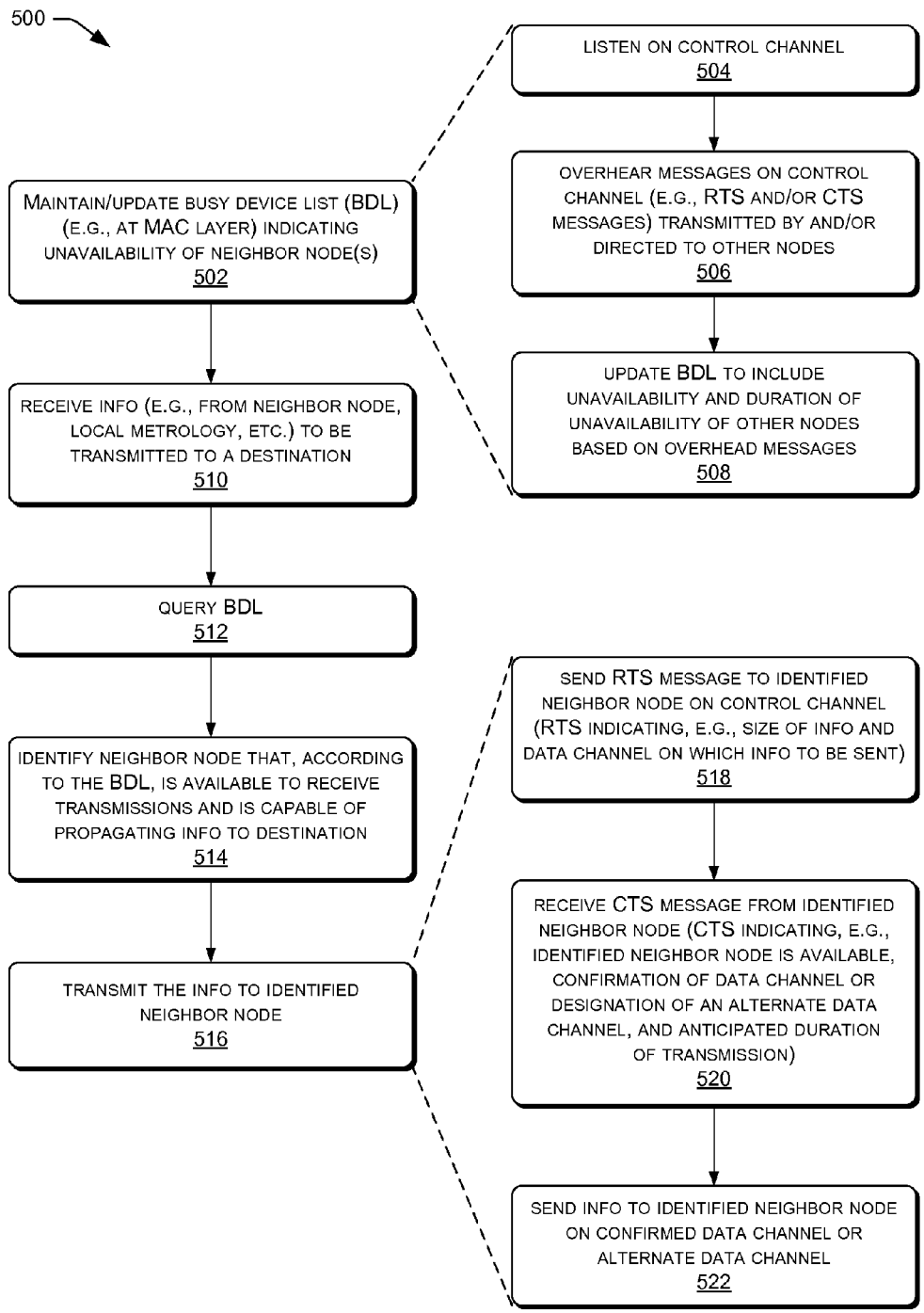
FIG. 5 is a flowchart illustrating an example method, which employs a busy device list to route transmissions in a multi-channel wireless mesh network.

FIG. 5 illustrates an example method 500 of qualifying links between nodes of a mesh network. The method 500 is described with reference to the example architecture 100 of FIG. 1 for convenience. However, the method 500 is not limited to use with the example architecture 100 of FIG. 1 and may be implemented using other architectures and devices.

According to method 500, at block 502, a node, such as node 102C, maintains and updates a busy device list, which includes availability information (i.e., busy, available, unavailable, etc.) of neighbor nodes, such as nodes 102A, 102B, and 102N. The busy device list may be implemented at the MAC sub-layer and may be stored in memory of the node 102C, for example.

In particular, the node 102C may maintain/update the busy device list by, at block 504, listening on a control channel (i.e., tuning radio 108 to the control channel to receive any communications transmitted on the control channel). At block 506, the node 102C may overhear one or more messages, such as RTS messages or CTS messages, transmitted by other nodes on the network. The overheard messages may contain reservation information including availability information (e.g., that particular nodes intend to transmit or receive data on one or more specified data channels) and duration information (e.g., a size of data to be transmitted, a time of transmission, and/or a starting time for the transmission). At block 508, the node 102C may update its busy device list to include the availability and duration of availability of the other nodes associated with the overheard messages.

At block 510, the node 102C may receive information (e.g., information propagated from a neighbor node, consumption information from the node's own metrology module 210, etc.) to be transmitted to a destination. At block 512, the node 102C queries the busy device list and, at block 514, identifies one or more neighbor nodes that, according to the busy device list, are both available and capable of propagating the information toward the destination. If more than one neighbor nodes meet this criteria, the node 102C may select which neighbor node to send the information to based on one or more other criteria (e.g., link quality, network traffic, random selection, etc.).

After identifying which neighbor node to send the information to, at block 516, the node 102C transmits the information to the identified neighbor node. In particular, in one example transmission process, at block 518, the node 102C may send an RTS message to the identified neighbor node on the control channel. The RTS message may include, for example, a size of the information to be transmitted, a data channel on which the node 102C prefers to send the information, a time at which the transmission will commence, and/or any other information useful in negotiating the transmission. If the neighbor node received the RTS and is available, at block 520, the node 102C will receive a CTS message from the neighbor node. The CTS message may include an indication that the identified neighbor node is available, confirmation of the data channel specified in the RTS or designation of an alternate data channel for the transmission, an anticipated duration of the transmission (based on the size of the data and the maximum data rate across the link), and/or any other information useful in negotiating the transmission. Finally, at operation 522, the node 102C sends the information to the identified neighbor node on the confirmed data channel or the alternate data channel.

The methods 300, 400, and 500 are illustrated as collections of blocks and/or arrows in logical flowcharts representing a sequence of operations that can be implemented in hardware, software, firmware, or a combination thereof. The order in which the blocks are described is not intended to be construed as a limitation, and any number of the described operations can be combined in any order to implement the method, or alternate methods. Additionally, individual operations may be omitted from the method without departing from the spirit and scope of the subject matter described herein. In the context of software, the blocks represent computer instructions that, when executed by one or more processors, perform the recited operations. In the context of hardware, the blocks may represent one or more circuits (e.g., application specific integrated circuits—ASICS) configured to execute the recited operations.

Example Protocol Data Units (PDUS)

Figure 6:
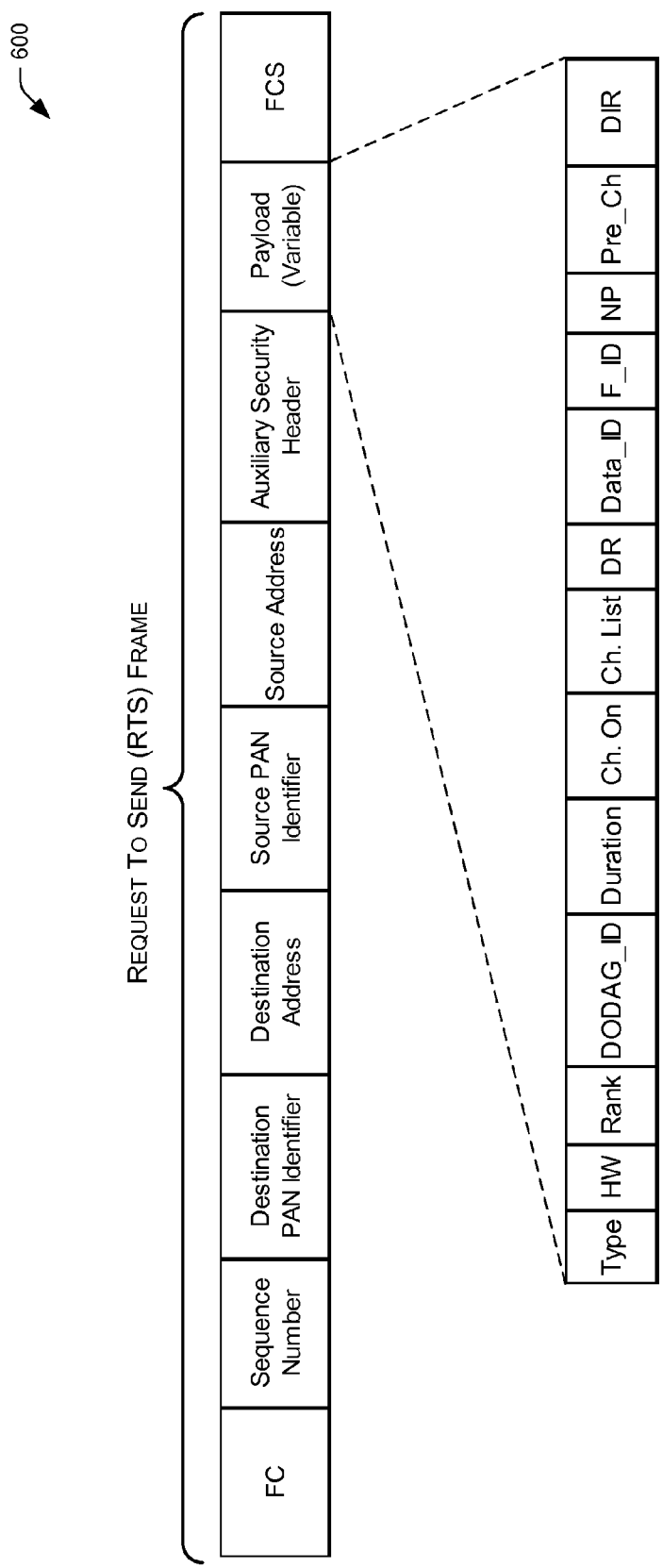
FIG. 6 is a schematic diagram of an example frame structure of a request-to-send message that may be used to indicate that a node wishes to send data to another node.
Figure 7:
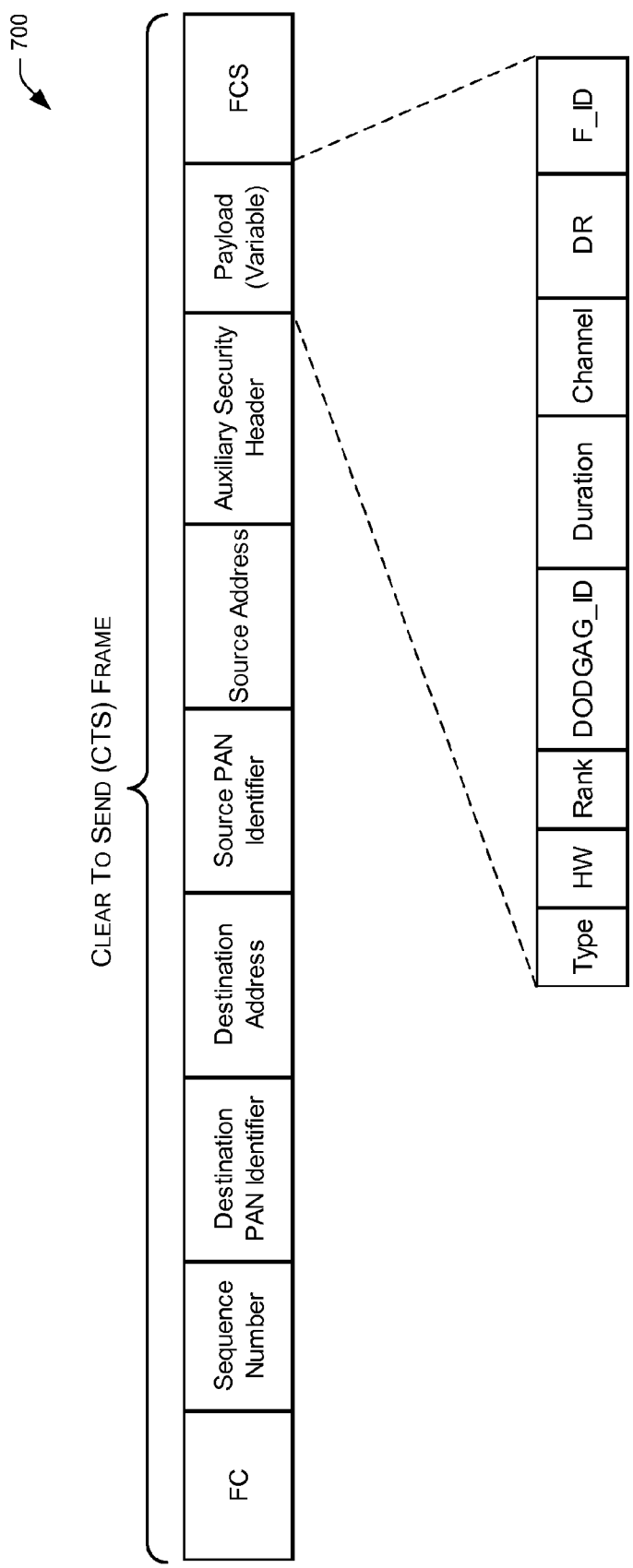
FIG. 7 is a schematic diagram of an example frame structure of a clear-to-send message that may be used to indicate that a node is available to receive data.

FIGS. 6 and 7 illustrate several example protocol data units (PDUs) which may be transferred via a control channel and/or data channel. The term PDU is used to herein to refer generally to any communication, message, or transmission within a communication network, such as that shown in FIG. 1. The term PDU is based, at least in concept, on the Open Systems Interconnection (OSI) Model and may comprise, for example, a bit, a frame, a packet, a segment, etc. In some instances, one or more layers of the OSI model may be utilized to transfer one or more PDUs between nodes. For example, the data link layer of the OSI model may be utilized to transfer PDUs between two or more of the nodes 102 in the architecture 100. In particular implementations, the media access control (MAC) sub-layer of the data link layer may be utilized to transfer PDUs between two or more of the nodes 102. Further, in some implementations, an access method may be utilized to transfer PDUs, such as the carrier sense multiple access with collision avoidance (CSMA/CA) method.

FIG. 6 illustrates an example request-to-send (RTS) frame 600 that may be used to indicate that a node wishes to send data to another node, while FIG. 7 illustrates an example clear-to-send (CTS) frame 700 that may be used to indicate that a node is available to receive data. In some examples, upon receiving a RTS message, a node may respond (if available) by sending a CTS message. In this example, the RTS and CTS frame structures are defined in part by the IEEE 802.15.4(e) standard. However, in other examples other PDU structures may be used for the RTS messages, CTS messages, or other communications conveying reservation information associated with the multi-channel communication network.

As discussed above, the RTS frame 600 and the CTS frame 700 (collectively referred to as data frames 600 and 700) contain information that is usable to qualify links between nodes of a multi-channel communication network and to route communications between and among nodes of the multi-channel communication network. The frames 600 and 700 are described with reference to the example network of architecture 100 of FIG. 1 and the example methods 300, 400 and 500 for convenience. However, the example frames 600 and 700 are not limited to use with the example architecture 100 or the methods 300, 400 and 500, and may be implemented using other architectures and devices and/or to perform other methods.

Referring to FIG. 6, the example RTS frame may be used to inform neighboring nodes that a node wishes to send data and will not be available for another transmission, and to negotiate a particular data channel and one or more physical (PHY) parameters (e.g., data rate and/or modulation technique) with an intended recipient node. As shown in FIG. 6, the RTS frame includes the following fields: frame control (FC), sequence number, destination personal area network (PAN) identifier, destination address, source PAN identifier, source address, auxiliary security header, payload, and frame check sequence (FCS). Details of the foregoing fields of the RTS frame other than the payload are well known to those skilled in the art and are not described in detail herein. The payload of the RTS frame, however, is customized to implement the routing techniques described above, as well as other functionalities. The payload may be variable in size and may include, for example, one or more of the following fields:

Type: This field indicates a type of the frame, e.g., RTS, CTS, not-clear-to-send (NCTS), etc. In the example of FIG. 6, this field indicates that the frame is an RTS frame.

HW: This field indicates a type of hardware of a node sending the RTS frame. The type may include, for example, a version or generation of device, and/or any other information usable to determine capabilities of the node (e.g., batter powered, modulation techniques and/or data rates that are supported by the node).

Rank: This field indicates a Routing Protocol for Low power and Lossy networks (RPL) rank (if known) of the node which is sending the RTS frame. The rank represents the cost of the path from the neighbor to the cell router and may be computed using, for example, the metric of Equation (1) to compute the ETT. The higher the rank is, the farther the node is from the cell router. This field may be utilized by a receiving node for routing consistency detection at the MAC sub-layer.

DODAG_ID: This field is a Destination Oriented Directed Acyclic Graph (DODAG) identifier (ID), which identifies a DODAG root (e.g., a network border router, cellular router, relay, etc.), through which the node sending the RTS is connected to a backhaul network, such as the Internet, for communication with central office or other network computing device. In the context of the architecture 100 of FIG. 1, Node A is an example of a DODAG root of the architecture 100 which is in communication with network 106, which is an example of a backhaul network. The DODAG_ID allows a node which receives the RTS frame to accept or reject the RTS frame by verifying routing consistency conditions at the MAC sub-layer.

Duration: This field indicates a total expected time for exchanging data frame(s) specified in the RTS. The duration may include time to transmit the specified data frames, waiting times such inter-frame spacing (IFS) (e.g., SIFS, GIFS, etc.) between frames, and acknowledgment (ACK) or non-acknowledgement (NACK) responses. The duration field may be used to determine a duration that a node will be busy communicating with another node and therefore unavailable to receive. The duration field may be used to populate the "Duration" column of a busy device list, such as busy device list 214 shown in FIG. 2.

Ch. On: This field includes a flag indicating whether the RTS includes a channels list.

Channels List: This field includes a channels list including a list of channels that are available to a node sending the RTS frame. A node receiving the RTS frame may select a channel from the available channels and specify this chosen channel inside a CTS frame. In some examples, the channel list may include less than all channels that are available to a node. For example, if a Direct-Sequence Spread Spectrum (DSSS) modulation is employed, the channel list may be limited to 13 channels in the 915 MHz ISM band. The channel list may comprise, for example, a list of qualified channels between the node that sent the RTS and the node that received the RTS. The list of qualified channels may be maintained in memory of the node that sent the RTS and/or the node that received the RTS, such as in the list of qualified links 212 maintained in memory 114 of node 102C described with reference to FIG. 2.

Data Rate (DR) parameters: This field indicates a maximum data rate supported and/or proposed by a node sending the RTS frame. A node receiving the RTS frame may utilize this field to determine a data rate of which both the sending and receiving nodes are capable. The determined data rate may be sent to the sending node using a CTS frame. The determined data rate will be set to at most the maximum data rate of a slower of the two nodes. Thus, if the RTS proposes a data rate higher than the receiving node is capable of, the receiving node will set a lower data rate (at most the maximum data rate of the receiving node) when sending the CTS frame.

Data_ID: This field includes an ID of a data packet. This ID may be present inside the RTS frame. This field may be utilized if, for example, the data packet was received by a particular node but an acknowledgement was not received at a node which sent the data packet. In this case, the node which sent the data packet with Data_ID may assume that the data packet was not received and may resend an RTS frame for the same Data_ID. In some cases, when the particular node keeps track of a number of last Data_IDs received, the particular node may respond with an ACK frame instead of a CTS frame, thus avoiding a retransmission of the data frame.

F_ID: This field includes a MAC frame ID of the RTS frame. The intended destination of the RTS frame will copy this F_ID in the CTS frame answering to this RTS frame. When the node sending RTS frame receives a CTS frame, it may use the F_ID in CTS frame to determine if the CTS frame is the expected one (i.e., it was sent in answer to the RTS frame the node has sent previously).

NP: This field indicates a number of packets to be exchanged with a node receiving the RTS frame. This field tells the receiving node how many packets to listen for on a specified data channel before switching back to listen on the control channel. This field may also be useful in determining availability of particular channels.

Pre_Ch: This field indicates a channel that a node prefers to utilize for exchanging data frames, such as the test data frames shown in FIG. 4. Nodes which are not involved in this exchange, but which overhear the RTS, may update their busy device lists (e.g., as described with reference to FIG. 3) based on this field. By default, the recipient of the RTS frame may select this channel for data exchange, if possible. However, if this channel is busy or is not a qualified channel of the link, the recipient node may designate a different channel in the CTS.

DIR: This field indicates whether traffic is from a root or is to be sent to the root. Traffic sent from a root toward a leaf is said to be "downstream," while all communications sent toward the root are said to be "upstream." The field may be set to 1 for upstream traffic and 0 for downstream traffic, for example.

FIG. 7, meanwhile, illustrates an example CTS message 700 in the form of a frame that may be communicated to indicate that a node is available to receive data. The CTS frame 700 may include, for example, PHY parameters and a data channel selected by the first node. In some instances, the CTS frame is utilized to inform neighboring nodes that the node sending the RTS and the node sending the CTS will be unavailable and that the selected data channel will be busy during a specified time period. In the example of FIG. 7, the CTS frame includes the following fields: FC, sequence number, destination PAN identifier, destination address, source PAN identifier, source address, auxiliary security header, payload, and FCS. Details of the foregoing fields of the CTS frame other than the payload are well known to those skilled in the art and are not described in detail herein. The payload of the CTS frame, however, is customized to implement the routing techniques described above, as well as other functionalities. The payload of the CTS frame may be variable in size and may include, for example, one or more of the following fields:

Type: This field may indicate information similar to that described above in reference to FIG. 6. In the example of FIG. 7, this field indicates that the frame is a CTS frame.

HW: This field includes hardware parameters (e.g., type of device, version or generation of device, etc.) of a node that received the RTS frame (i.e., the node that will send the CTS frame).

Rank: This field is analogous to the corresponding field of the RTS frame, but as applied to the CTS frame. This field may be used in ranking links according to their relative quality in, for example, the qualified links list 212 shown in FIG. 2.

DODAG_ID: This field is analogous to the corresponding field of the RTS frame, but as applied to the CTS frame. Specifically, this field is a DODAG identifier providing a choice for a node which receives the CTS frame to accept or reject by verifying routing consistency conditions at a MAC sub-layer.

Duration: This field is analogous to the corresponding field of the RTS frame, but as applied to the CTS frame, and may be used in determining availability and duration of availability, such as for maintaining the busy device list 214 of FIG. 2.

Channel: This field indicates a data channel selected by the node that received the RTS frame.

DR: This field indicates a data rate selected by the node that received the RTS frame. The data rate may be the same (if the receiving node is capable of the data rate) or different than the data rate specified in the RTS (if the receiving node is not capable of the data rate specified in the RTS). This data rate may be implemented to transfer data on a data channel, such as the test data packets described with reference to FIG. 4.

F_ID: This field includes a MAC frame ID of the CTS frame, which may be identical to the F_ID value of the RTS frame.

As discussed above, the RTS and CTS frames 600 and 700 are merely examples of some PDUs that may be used to implement the routing techniques described herein. In other embodiments various other PDUs may be employed to implement the described routing techniques.

CONCLUSION

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:
1. A method comprising:
under control of a node of a multi-channel communication network:
receiving information to be transmitted to a destination, wherein receiving the information comprises receiving the information from a first neighbor node along with an indication that the information is to be transmitted to the destination;

querying a busy device list maintained in memory of the node, the busy device list including information regarding availability of one or more neighbor nodes and including information indicating a duration that the one or more other neighbor nodes will be busy;

determining a link quality of links between the node and the one or more neighbor nodes;

identifying a second neighbor node, based at least in part on the busy device list and the determined link quality, to receive transmissions and to transmit the information to the destination;

delaying a transmission until a device on the busy device list, having a determined link quality that is higher than a currently available device, becomes available; and transmitting the information to the identified second neighbor node via the device.

2. The method of claim 1, wherein receiving the information comprises receiving the information from a local metrology module of the node, the information including resource consumption data to be transmitted to the destination.

3. The method of claim 1, wherein the busy device list is maintained at a medium access control (MAC) sub layer of the node.

4. The method of claim 1, further comprising updating the busy device list based on reservation information contained in messages overheard by the node on a control channel of the multi-channel communication network, the reservation information including an indication of nodes that are busy and a duration that they will be busy.

5. The method of claim 4, wherein the messages overheard by the node include:

request-to-send (RTS) messages addressed to other nodes of the multi-channel communication network; and/or clear-to-send (CTS) messages addressed to other nodes of the multi-channel communication network.

6. The method of claim 1, further comprising:

listening on a control channel of the multi-channel communication network;

overhearing messages transmitted by and/or directed to other nodes on the control channel, the overheard messages indicating unavailability and duration of unavailability of the other nodes; and updating the busy device list to include the unavailability and duration of unavailability of the other nodes based on the overhead messages.

7. The method of claim 1, wherein transmitting the information to the identified neighbor node comprises:

sending a request-to-send (RTS) message to the identified neighbor node on a control channel, the RTS indicating a size of information to be sent and a data channel on which the information is to be sent;

receiving a clear-to-send (CTS) message from the identified neighbor node, the CTS message indicating that:

the identified neighbor node is available to receive the information;

a confirmation that the data channel on which the information is to be sent is acceptable, or designation of an alternate data channel on which to send the information; and an anticipated duration of transmission of the information, the anticipated duration of transmission being based on the size of the information and a maximum data rate of transmission between the node and the identified neighbor node; and sending the information to the identified neighbor node on the data channel confirmed in the CTS or the alternate data channel specified in the CTS.

8. The method of claim 1, wherein the node comprises a smart utility meter.

9. A network computing device comprising:

one or more processors;

memory communicatively coupled to the one or more processors;

a busy device list maintained in the memory of the network computing device, the busy device list indicating an unavailability and duration of unavailability of other network computing devices of a multi-channel communication network;

a qualification module to determine a link quality of links between the network computing device and one or more of the other network computing devices; and a routing module stored in the memory and executable by the one or more processors to route communications from the network computing device based at least in part on the busy device list, wherein the routing module utilizes availability as indicted by the busy device list and utilizes the link quality of the links as indicated by the qualification module, and wherein the routing of a communication is delayed until a device on the busy device list, having a determined link quality that is higher than a currently available device, becomes available to route the communication.

10. The network computing device of claim 9, further comprising a multi-channel radio capable of sending and receiving communications on multiple different channels.

11. The network computing device of claim 10, further comprising a frequency hopping module configured to switch between the multiple different channels in accordance with a predefined frequency hopping pattern of the multi-channel communication network.

12. The network computing device of claim 9, wherein the routing module is further configured to update the busy device list based on reservation information contained in messages overheard by the network computing device on a control channel of the multi-channel communication network, the reservation information including an indication of network computing devices that are busy and a duration that they will be busy.

13. The network computing device of claim 9, further comprising a qualification module stored in the memory and executable on the one or more processors to:

determine a link quality of links between the network computing device and one or more other network computing devices;

qualify one or more of the links between the network computing device and the respective network computing devices in response to the determining that the link quality of the one or more links meets the predetermined threshold quality; and store a list of qualified links in the memory of the network computing device.

14. The network computing device of claim 9, further comprising a metrology module stored in the memory and executable by the one or more processors to collect resource consumption data from a physical location of the network computing device.

15. The network computing device of claim 14, wherein the resource consumption data comprises electricity consumption data, water consumption data, and/or natural gas consumption data.

16. A network computing device, comprising:
one or more processors;
memory communicatively coupled to the one or more processors;
a busy device list maintained in the memory of the network computing device by operation of the one or more processors, the busy device list indicating availability information and a duration that busy devices will be busy, for one or more neighbor nodes of the network computing device in a multi-channel communication network;
a qualified links list comprising link quality of a predetermined number of links to a subset of the one or more neighbor nodes; and
a routing module stored in the memory and executable by the one or more processors to route communications from the network computing device based at least in part on the busy device list and based at least in part on the qualified links list, wherein a communication is delayed until a device on the busy device list, having a determined link quality that is higher than a currently available device, becomes available and routes the communication.

17. The network computing device of claim 16, further comprising:
a multi-channel radio capable of sending and receiving communications on multiple different channels; and
a frequency hopping module configured to switch between the multiple different channels in accordance with a predefined frequency hopping pattern of the multi-channel communication network.

18. The network computing device of claim 16, wherein the routing module is further configured to update the busy device list based on reservation information contained in messages overheard by the network computing device on a control channel of the multi-channel communication network, the reservation information including an indication of network computing devices that are busy and a duration that they will be busy.

19. The network computing device of claim 16, further comprising a qualification module stored in the memory and executable by the one or more processors to:
determine a link quality of links between the network computing device and one or more other network computing devices;
qualify one or more of the links between the network computing device and the respective network computing devices in response to the determining that the link quality of the one or more links meets the predetermined threshold quality; and
store a list of qualified links in the memory of the network computing device.

20. The network computing device of claim 16, further comprising:
a metrology module stored in the memory and executable by the one or more processors to collect resource consumption data from a physical location of the network computing device;
wherein the resource consumption data comprises electricity consumption data, water consumption data, and/or natural gas consumption data.

* * * * *